(12) United States Patent
Mizunashi

(10) Patent No.: US 8,386,819 B2
(45) Date of Patent: Feb. 26, 2013

(54) COMMUNICATION APPARATUS AND METHOD HAVING ONE OR MORE COMMUNICATION CONTROL PROGRAMS

(75) Inventor: Ryosuke Mizunashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 258 days.

(21) Appl. No.: 12/849,852

(22) Filed: Aug. 4, 2010

(65) Prior Publication Data

US 2011/0040992 A1 Feb. 17, 2011

(30) Foreign Application Priority Data

Aug. 17, 2009 (JP) .................................. 2009-188675

(51) Int. Cl.
G06F 1/26 (2006.01)
G06F 3/12 (2006.01)

(52) U.S. Cl. ....... 713/320; 713/300; 713/324; 358/1.13; 358/1.14

(58) Field of Classification Search .................. 713/300, 713/320, 324

See application file for complete search history.

(56) References Cited

U.S. PATENT DOCUMENTS

| | | | | |
|---|---|---|---|---|
| 6,950,953 | B2 * | 9/2005 | Kizawa et al. ................. | 713/324 |
| 7,516,335 | B2 * | 4/2009 | Watanabe ...................... | 713/300 |
| 7,555,662 | B2 * | 6/2009 | Kidoguchi .................... | 713/323 |
| 7,755,779 | B2 * | 7/2010 | Miura et al. .................. | 358/1.13 |
| 7,982,889 | B2 * | 7/2011 | Okada .......................... | 358/1.14 |
| 2006/0236143 | A1 * | 10/2006 | Kidoguchi .................... | 713/320 |
| 2007/0183107 | A1 | 8/2007 | Okada | |
| 2009/0077164 | A1 | 3/2009 | Phillips et al. | |
| 2009/0177896 | A1 | 7/2009 | Ito et al. | |
| 2009/0282278 | A1 * | 11/2009 | Satoh ............................ | 713/321 |
| 2009/0323120 | A1 * | 12/2009 | Yamanaka .................... | 358/1.16 |
| 2010/0067035 | A1 | 3/2010 | Kawakubo et al. | |
| 2012/0173896 | A1 * | 7/2012 | Tanaka .......................... | 713/300 |

FOREIGN PATENT DOCUMENTS

| | | |
|---|---|---|
| JP | 2005-045301 | 2/2005 |
| JP | 2007-301841 | 11/2007 |

OTHER PUBLICATIONS

PCT Document—WO 2006/043436 A1; 39 pages—Dated Apr. 27, 2006.*
"Somniloquy—Maintaining Network Connectivity While Your Computer Sleeps" —14 pages; Dated Mar. 2008.*
Extended European Search Report dated Dec. 7, 2010.

* cited by examiner

*Primary Examiner* — Brian Misiura
(74) *Attorney, Agent, or Firm* — IPUSA, PLLC

(57) ABSTRACT

A communication apparatus includes an automatic response unit configured to make a response to received data in a power saving state on behalf of one or more communication control programs, and a setting unit configured to collect automatic response information from the one or more communication control programs and to set the automatic response information in the automatic response unit, the automatic response information including conditions regarding received data to which the automatic response unit makes a response, and also including response data to be included in the response, wherein the automatic response unit sends the response data included in the automatic response information upon detecting that the conditions included in the automatic response information match data received in the power saving state, and causes the communication apparatus to exit the power saving state upon detecting that the conditions do not match said data received in the power saving state.

6 Claims, 12 Drawing Sheets

- MAC ADDRESS
- IP ADDRESS
- PORT NUMBER LIST
- AUTOMATIC RESPONSE INFORMATION LIST

COMMUNICATION APPARATUS AND METHOD HAVING ONE OR MORE COMMUNICATION CONTROL PROGRAMS

BACKGROUND OF THE INVENTION

1. Field of the Invention

The disclosures herein generally relate to communication apparatuses, communication methods, and programs, and particularly relate to a communication apparatus, communication method, and program which have an energy saving mode.

2. Description of the Related Art

Various types of electronic devices are designed to reduce power consumption by entering an operation state referred to as a minimum power state, an energy saving state, a power saving state, or the like (which will hereinafter be referred to as a "power saving state") when no operational input is given for a sustained period. Such electronic devices exit a power saving state to enter a normal operating state (hereinafter referred to as a "normal power state") in response to the inputting of operational instruction.

An electronic device with communication function (hereinafter referred to as a communication apparatus) may be designed to respond to a received packet. Frequency of packet reception is generally higher than the frequency of operational instruction entered by users. If recovery to a normal power state is performed each time a packet is received in a power saving state, it becomes difficult to effectively reduce power consumption. In consideration of this, communication apparatus hardware may be divided into a main system and a sub system, thereby prolonging the duration of power saving state.

The main system hardware may include a main CPU that controls the functions of the apparatus. The sub-system hardware may include a sub CPU that controls communication in the power saving state. Power consumption by the sub system is significantly lower than power consumption by the main system. When the communication apparatus enters a power saving state, the supply of power to the main system is suspended or reduced, and the sub system processes received packets. With such a configuration, it is possible to prolong the duration of the no-operation state (i.e., power saving state) of the main system.

Conventionally, tasks performed by the sub system (i.e., the responsibility of the sub system) are limited to simple, routine tasks such as a response to an ARP (Address Resolution Protocol) request, a response to PING, etc. Depending on how the communication apparatus is used by users, thus, there may be a case in which power consumption is not effectively achieved.

Specifically, the communication apparatus may be an image forming apparatus to which application and communication control modules can be freely added, for example. When an application or communication control module is newly installed, the frequency of the apparatus returning to a normal power state may be increased due to the installation. Namely, the installed application or communication control module performs communication that may increase the frequency of reception of packets that are outside the area of responsibility of the sub system. As a result, the main system may exit the power saving state more often. Further, there may be additional conditions for recovery or processes for adequate recovery due to the added application or communication control module.

An installed application or the like may differ depending on how the communication apparatus is used by users, and is thus difficult to predict in advance. This makes it difficult for a conventional fixed sub-system to cope.

Accordingly, it may be preferable to provide a communication apparatus, a communication method, and a program that can properly maintain a power saving state.

SUMMARY OF THE INVENTION

It is a general object of at least one embodiment to provide a communication apparatus and a communication method that substantially eliminate one or more problems caused by the limitations and disadvantages of the related art.

In one embodiment, a communication apparatus having one or more communication control programs for controlling communication includes: an automatic response unit configured to make a response to received data in a power saving state on behalf of the one or more communication control programs; and a setting unit configured to collect automatic response information from the one or more communication control programs and to set the automatic response information in the automatic response unit, the automatic response information including conditions regarding received data to which the automatic response unit makes a response, and the automatic response information also including response data to be included in the response, wherein the automatic response unit sends the response data included in the automatic response information upon detecting that the conditions included in the automatic response information match data received in the power saving state, and causes the communication apparatus to exit the power saving state upon detecting that the conditions do not match said data received in the power saving state.

In one embodiment, a communication method in a communication apparatus having one or more communication control programs for controlling communication includes: an automatic response step of, by use of an automatic response unit, making a response to received data in a power saving state on behalf of the one or more communication control programs; a setting step of, by use of a setting unit, collecting automatic response information from the one or more communication control programs and setting the automatic response information in the automatic response unit, the automatic response information including conditions regarding received data to which the automatic response unit makes a response, and the automatic response information also including response data to be included in the response; and a recovery control step of causing the communication apparatus to exit the power saving state based on comparison of received data in the power saving state with the automatic response information, wherein the automatic response step sends the response data included in the automatic response information upon detecting that the conditions included in the automatic response information match data received in the power saving state, and causes the communication apparatus to exit the power saving state upon detecting that the conditions do not match said data received in the power saving state.

In one embodiment, a computer-readable recording medium has a program recorded therein for causing a communication apparatus having one or more communication control programs for controlling communication to function as: an automatic response unit configured to make a response to received data in a power saving state on behalf of the one or more communication control programs; and a setting unit configured to collect automatic response information from the one or more communication control programs and to set the automatic response information in the automatic response unit, the automatic response information including conditions regarding received data to which the automatic response unit makes a response, and the automatic response information also including response data to be included in the response, wherein the automatic response unit sends the response data included in the automatic response information upon detecting that the conditions included in the automatic response information match data received in the power saving state, and causes the communication apparatus to exit the power saving state upon detecting that the conditions do not match said data received in the power saving state.

According to at least one embodiment, the power saving state is properly maintained, and recovery from the power saving state is properly made.

BRIEF DESCRIPTION OF THE DRAWINGS

Other objects and further features of embodiments will be apparent from the following detailed description when read in conjunction with the accompanying drawings, in which:

FIG. 8 is a drawing showing an example of the configuration of proxy communication control information;

DESCRIPTION OF THE PREFERRED EMBODIMENTS

Figure 1:
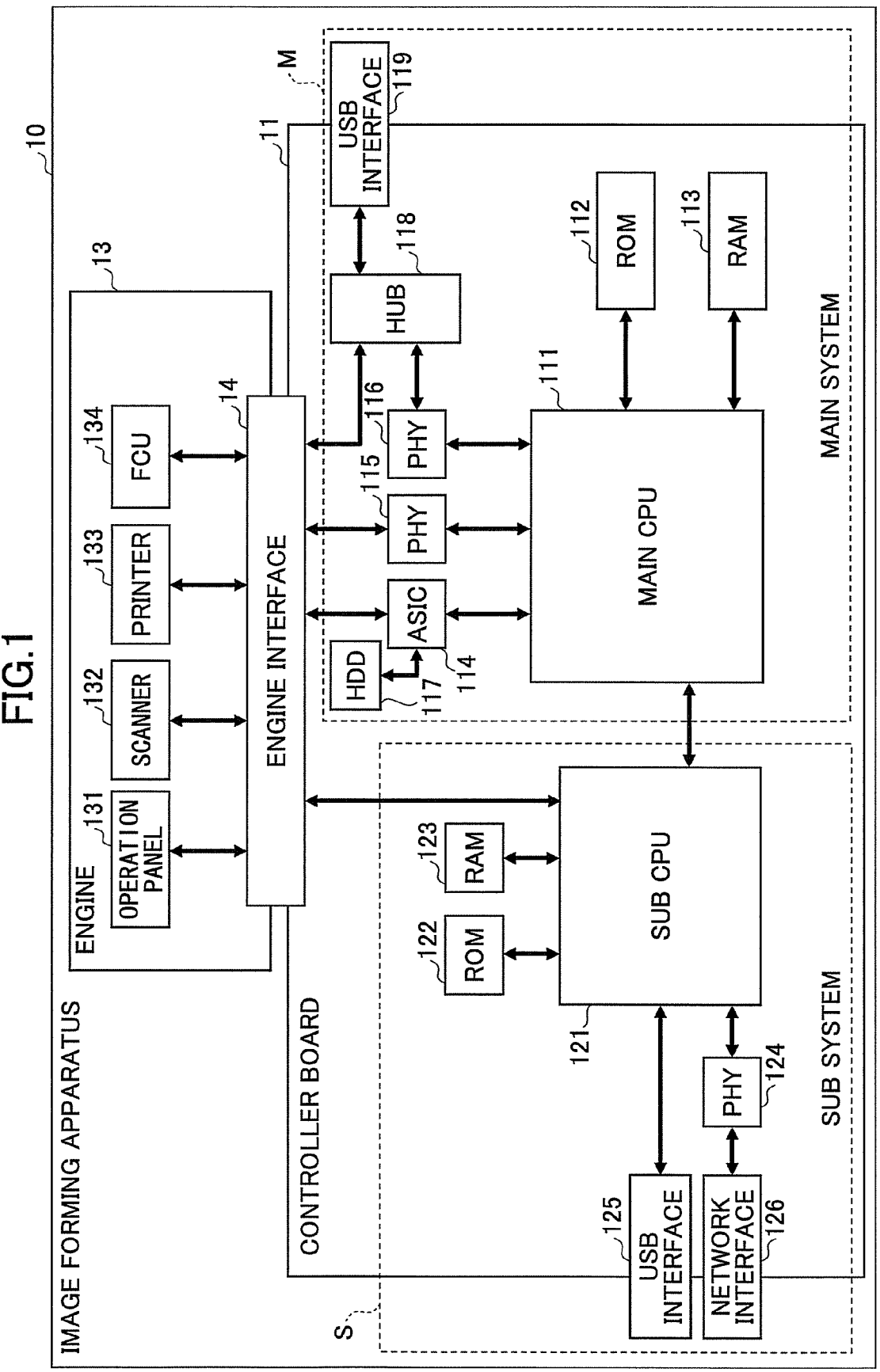
FIG. 1 is a drawing showing an example of the hardware configuration of an image forming apparatus according to a present embodiment.

In the following, embodiments of the present invention will be described with reference to the accompanying drawings. These embodiments will be described by using an image forming apparatus as an example of a communication apparatus. FIG. 1 is a drawing showing an example of the hardware configuration of an image forming apparatus according to the present embodiment. In FIG. 1, an image forming apparatus 10 includes a controller board 11 and an engine 13.

The controller board 11 and the engine 13 are connected through an engine interface 14.

A main CPU 111 and a sub CPU 121 are disposed on the controller board 11. The main CPU 111 is a CPU for a main system M. The sub CPU 121 is a CPU for a sub system S. The main CPU 111 and the sub CPU 121 are connected to each other through a bus. In FIG. 1, arrows represent one or more buses.

The main system M is comprised of a hardware set that controls the image forming apparatus 10 in a normal power state. The sub system S is comprised of a hardware set that controls the image forming apparatus 10 in a power saving state. The power saving state refers to a state in which power is supplied only to the sub system S, or power supplied to the main system M or the engine 13 is reduced, in order to reduce power consumption when no operational input is given for a sustained period, for example. The power saving state is also generally referred to as a power saving mode, an energy saving mode, a minimum power state, or the like. The normal power state refers to a state other than the power saving state. Namely, the normal power state refers to a state in which the supply of power to the main system M, the sub system S, and the engine 13 is not restricted.

In the main system M, the main CPU 111 is connected through one or more buses to a ROM 112, a RAM 113, an ASIC (Application Specific Integrated Circuit) 114, a PHY chip 115, and a PHY chip 116. The main CPU 111 controls the overall functions of the image forming apparatus 10 based on programs stored in the ROM 112 and loaded to the RAM 113. The ASIC 114 mainly performs image processing. The ASIC 114 is connected to an HDD (hard disk drive) 117 and to an engine interface 14 through one or more buses. The PHY chip 115 converts logic signals from the main CPU 111 into electrical signals for provision to the engine interface 14. The PHY chip 116 converts logic signals from the main CPU 111 into electrical signals for provision to a hub 118. The hub 118 is connected to a USB interface 119 and to the engine interface 14 through one or more buses. The USB interface 119 is a hardware interface for supporting USB connection.

In the sub system S, the sub CPU 121 is connected through one or more buses to a ROM 122, a RAM 123, a PHY 124, and a USB interface 125. The sub CPU 121 controls the operations (i.e., mainly communication processes) of the image forming apparatus 10 in the power saving mode based on programs stored in the ROM 122 and loaded to the RAM 123. The PHY chip 124 converts logic signals from the sub CPU 121 into electrical signals for provision to a network interface 126. The network interface 126 is a hardware used for connection with a network such as a LAN (Local Area Network), and provides physical layer functions in network communication.

The engine 13 includes an operation panel 131, a scanner 132, a printer 133, and an FCU (facsimile control unit) 134. The operation panel 131 includes a display means such as a liquid crystal panel and an inputting means such as hardware keys. The scanner 132 scans documents, and supplies scanned image data to the ASIC 114 through the engine interface 14. The printer 133 prints image data on a print sheet as the image data is supplied from the ASIC 114 through the engine interface 14. The FCU 134 performs facsimile transmission and reception.

Figure 2:
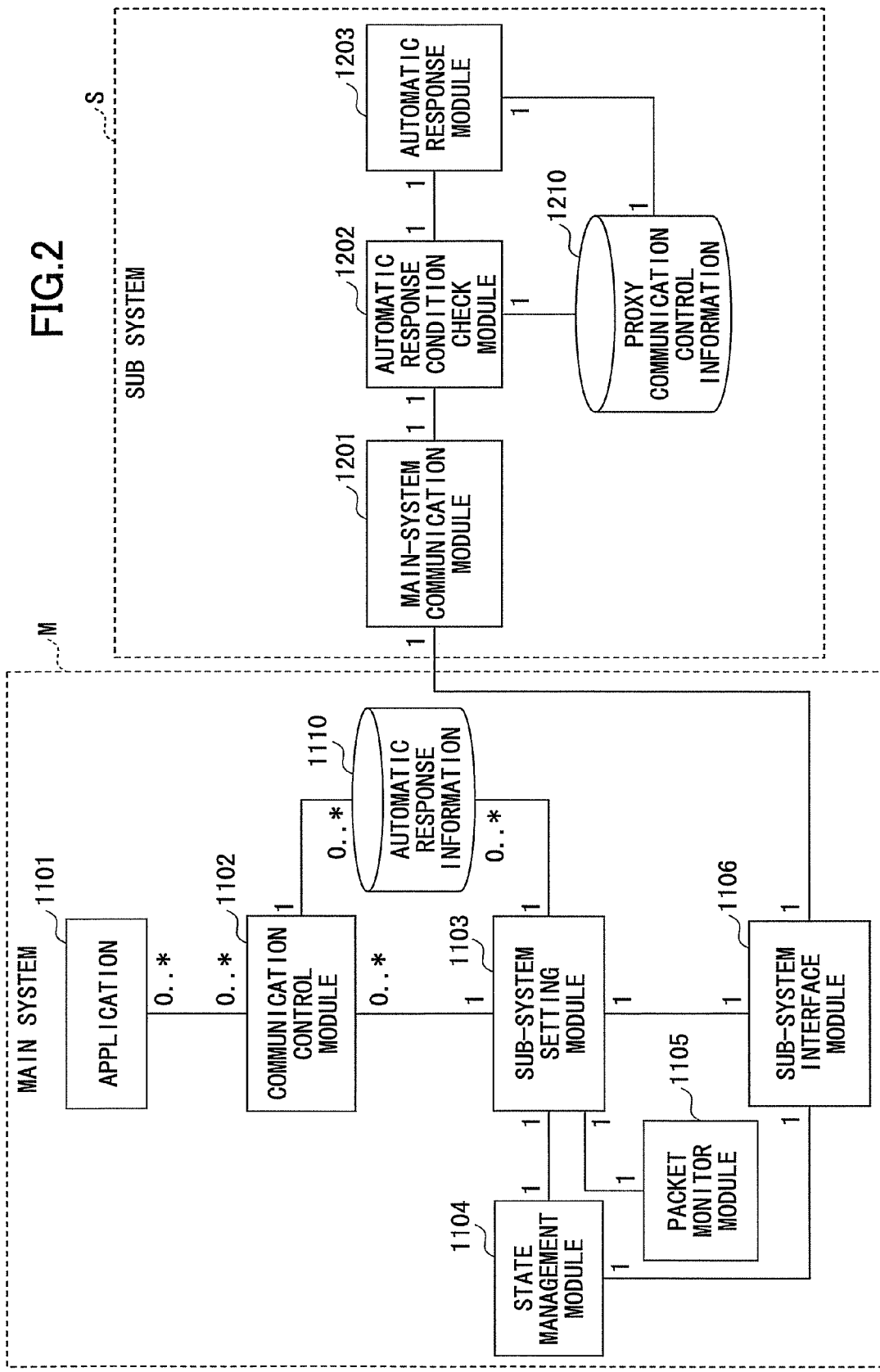
FIG. 2 is a drawing showing an example of the software module configuration of the image forming apparatus according to the present embodiment.

FIG. 2 is a drawing showing an example of the hardware module configuration of the image forming apparatus according to the present embodiment.

In FIG. 2, the main system M includes an application 1101, a communication control module 1102, a sub-system setting module 1103, a state management module 1104, a packet monitor module 1105, and a sub-system interface module 1106. Each program module is stored in the ROM 112 and loaded to the RAM 113. Each program module loaded to the RAM 113 includes process steps, which are performed by the main CPU 111 to achieve the function of the program module.

The communication control module 1102 is a program for providing network communication control functions to the application 1101. The communication control module 1102 is provided separately for each protocol (i.e., protocol in the application layer). For example, there are communication control modules 1102 in one-to-one correspondence to the SNMP (Simple Network Management Protocol), the Bonjour protocol, and the WSD (Web Services on Devices) protocol to perform processes corresponding to the respective communication protocols. The communication control module 1102 may be freely installed (i.e., added) or uninstalled (i.e., removed) in the image forming apparatus 10.

The sub-system setting module 1103 collects automatic response information 1110 from each communication control module 1102, and sets proxy communication control information 1210 inclusive of the collected automatic response information 1110 to the sub system S through the sub-system interface module 1106. The automatic response information 1110 includes conditions for identifying received data (i.e., received packet) to which the sub system S responds on behalf of the communication control module 1102 in the power saving state, and includes data (i.e., response data) that is to be included in the response made by the sub system S. In the present embodiment, a proxy response made by the sub system S in the power saving state is also referred to as an "automatic response". The automatic response information 1110 collected from a given communication control module 1102 has a value specific to the given communication control module 1102. When the main system M is recovered only in response to specific received data (i.e., received packet), the automatic response information 1110 may also include information about such specific received data. The main system may recover when the received data (i.e., received packet) is directed to some multicast addresses. In such a case, the automatic response information 1110 may include a list of multicast addresses. Any packet is disregarded if the packet is neither subjected to automatic response nor a cause of recovery of the main system M.

The proxy communication control information 1210 is used by the sub system S in order to control automatic responses and to check the necessity to recover the main system M.

The state management module 1104 checks whether to enter the power saving state, and controls transition to the power saving state. The packet monitor module 1105 monitors data (i.e., packet) received by the image forming apparatus 10 from a network. The packet monitor module 1105 counts the number of data receptions of the data that match the conditions specified in the automatic response information 1110 separately for each item of the automatic response information 1110. The sub-system interface module 1106 provides an interface for communication with the sub system S.

In FIG. 2, numerals and the like depicted alongside lines connecting between the program modules indicate the degree of multiplicity between the modules connected by these lines. According to this notation, 0 to plural communication control modules 1102 may exist in the main system M. According to this notation, further, one communication control module 1102 has 0 to plural items of the automatic response information 1110. Moreover, one communication control module 1102 may be used by a plurality of applications 1101 that perform communication by use of the same communication protocol.

The sub system S includes a main-system communication module 1201, an automatic response condition check module 1202, and an automatic response module 1203. Each program module is stored in the ROM 122 and loaded to the RAM 123. Each program module loaded to the RAM 123 includes process steps, which are performed by the sub CPU 121 to achieve the function of the program module.

The automatic response condition check module 1202 receives information from the main system M and transmits requests to the main system M. One example of the information received from the main system M is the proxy communication control information 1210. One example of the requests sent to the main system M is a request to recover the main system M.

The automatic response condition check module 1202 determines whether to automatically respond to a received packet or to make the main system M respond based on the automatic response information 1110 included in the proxy communication control information 1210 set by the main system M. If the received packet does not fall into either category, such a packet may be disregarded. The automatic response module 1203 automatically responds to the received packet based on the automatic response information 1110 if the automatic response is selected by the automatic response condition check module 1202.

Figure 3:
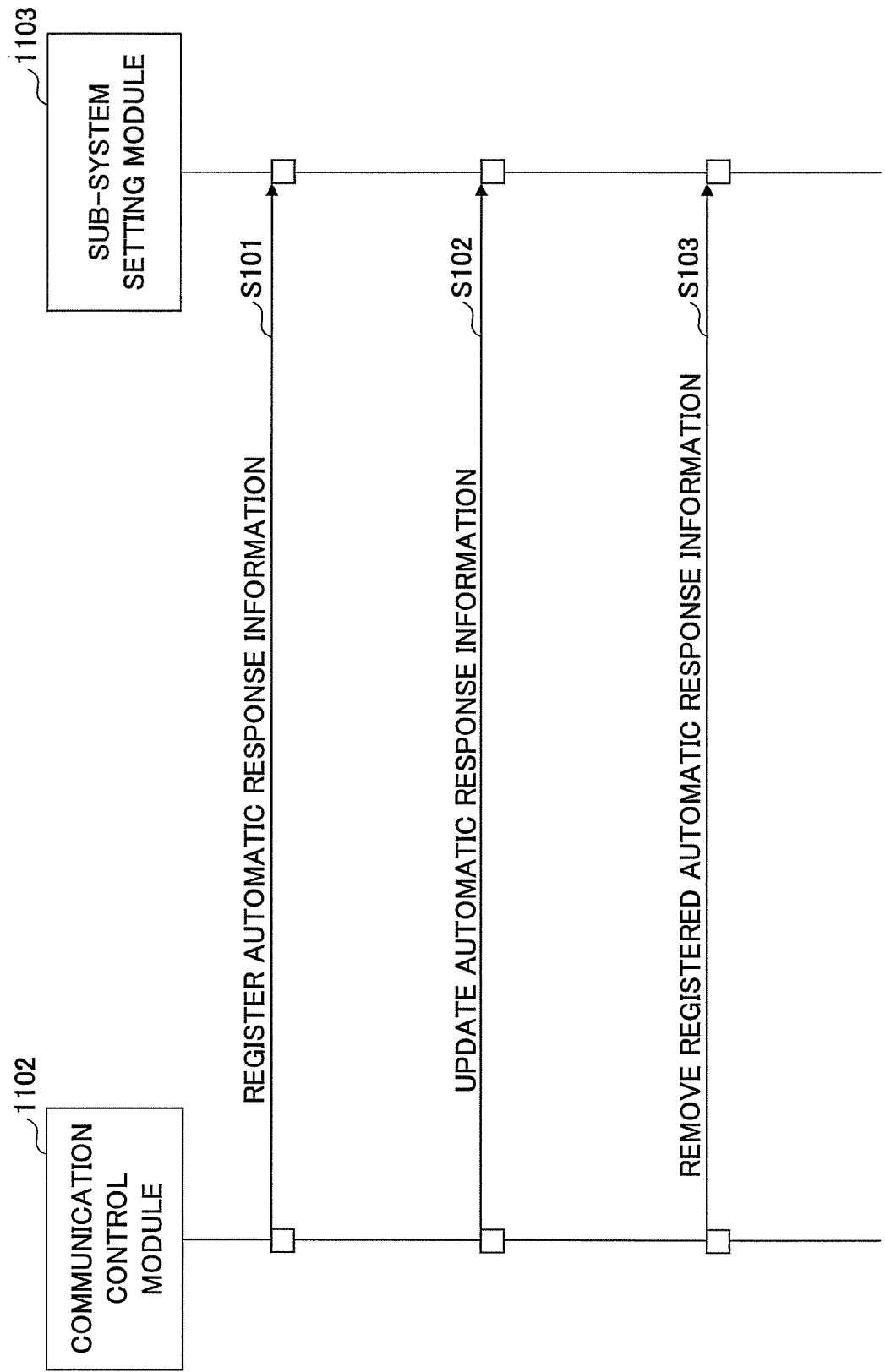
FIG. 3 is a sequence chart illustrating the process of collecting automatic response information from a communication control module.

In the following, an operation procedure performed by the image forming apparatus 10 will be described. FIG. 3 is a sequence chart illustrating the process of collecting automatic response information from a communication control module.

In step S101, the automatic response information 1110 kept in the communication control module 1102 is collected (i.e., registered) by the sub-system setting module 1103. The sub-system setting module 1103 stores the collected information in the RAM 113 in such a manner that the collected information is associated with the communication control module 1102 from which it is collected.

Figure 4:
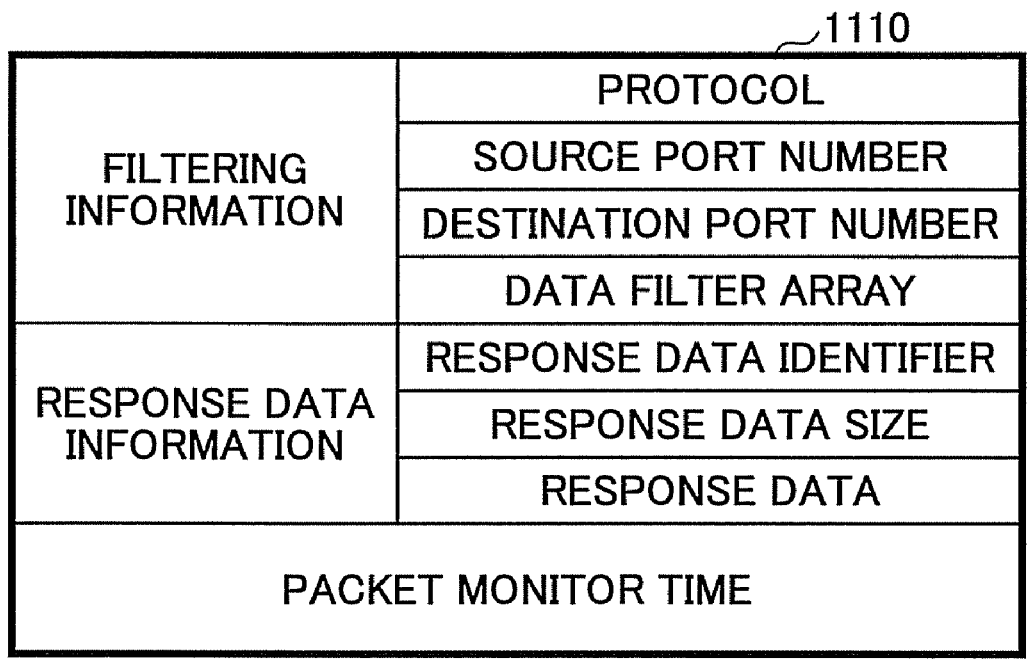
FIG. 4 is a drawing showing an example of the configuration of automatic response information.

FIG. 4 is a drawing showing an example of the structure of automatic response information. In FIG. 4, the automatic response information 1110 includes filtering information, response data information, a packet monitoring time, etc. The filtering information specifies the conditions for making an automatic response. Namely, an automatic response is made for a received packet that matches the conditions specified in the filtering information. In FIG. 4, the filtering information includes a protocol, a source port number, a destination port number, a data filter array, etc. The protocol specifies a communication protocol. For example, the protocol may indicate "ether/ip/udp/snmp," "ether/ip/udp/bonjour," or "ether/ip/udp/wsd," for example. This example uses the notation "<data-link-layer protocol name>/<network-layer protocol name>/<transport-layer protocol name>/<application-layer protocol name>." The communication protocol typically specifies the communication protocol of the communication control module 1102 that owns the automatic response information 1110. The source port number and destination number indicate numbers that identify a source port and a destination port. The data filter array is an array of data filters.

Figure 5:
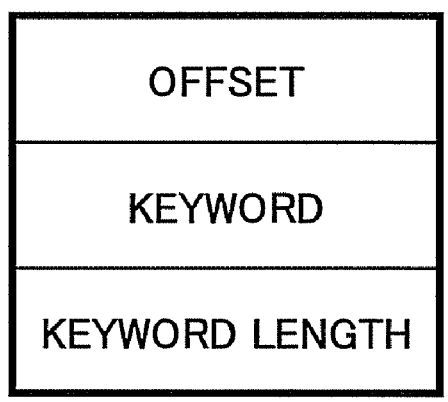
FIG. 5 is a drawing showing an example of the configuration of a data filter.

FIG. 5 is a drawing showing an example of the structure of a data filter. The data filter includes items such as an offset, a keyword, and a keyword length. The offset indicates an offset value as counted from the beginning of a packet data portion, which may be a portion following the UDP header in the case of a UDP (User Datagram Protocol) packet. The keyword is a character string that is to be matched. The keyword length is a length of a keyword.

A received packet may include a character string specified by the keyword and keyword length of the data filter at the position specified by the offset of the data filter. In such a case, it is determined that the received packet matches this data filter. The automatic response information 1110 may include an array of data filters, so that plural data filters can be set in the automatic response information 1110. In this manner, the data filter may be configured such that the structure of data to be compared does not matter. No matter what protocol is used in an upper layer of the UDP, for example, it is thus possible to perform matching by use of the data filter. In the present embodiment, a received packet for which the transport-layer communication protocol is UDP is subjected to automatic response. TCP is not suitable for automatic response since the procedure for establishing connection and the procedure for ensuring reliability are complicated. However, this does not mean that the present invention is limited to the use of UDP. It merely means that a connectionless-type protocol such as UDP is suitable for automatic response.

Referring to FIG. 4 again, the response data information indicates the contents of response that is to be returned in response to the received packet that matches the filtering information. In FIG. 4, the response data information includes items such as a response data identifier, a response data size, and response data. The response data identifier is an identifier (ID) indicative of predetermined response data. The predetermined response data refers to data stored in the ROM 122 of the sub system S in advance. When a response data identifier is specified in the response data information, the data corresponding to the response data identifier is returned as a response to the received packet. There is an exclusive relationship between the response data identifier and a set of the response data size and response data. Only one of the response data identifier and the set of response data size and response data may be specified or used. The response data size indicates the size of response data. The response data is actual data contents that are to be transmitted as a response to the received packet. With this arrangement that allows a response data size and response data to be specified in the response data information, the communication control module 1102 may be able to freely specify response data at the time of automatic response.

The packet monitor time will be described later.

Step S101 is performed when the image forming apparatus 10 is powered on or when a new communication control module 1102 is installed in the normal power state, for example. At the time of power-on of the image forming apparatus 10, the sub-system setting module 1103 collects the automatic response information 1110 having a specific value from each communication control module 1102 installed in the image forming apparatus 10. When a new communication control module 1102 is installed, the automatic response information 1110 of this communication control module 1102 is additionally registered in the sub-system setting module. The RAM 113 of the main system M stores a list of automatic response information pieces 1110 collected from the respective communication control modules 1102 that have already been installed. Accordingly, the sub-system setting module 1103 and the automatic response information 1110 have relationships as illustrated in FIG. 6.

Figure 6:
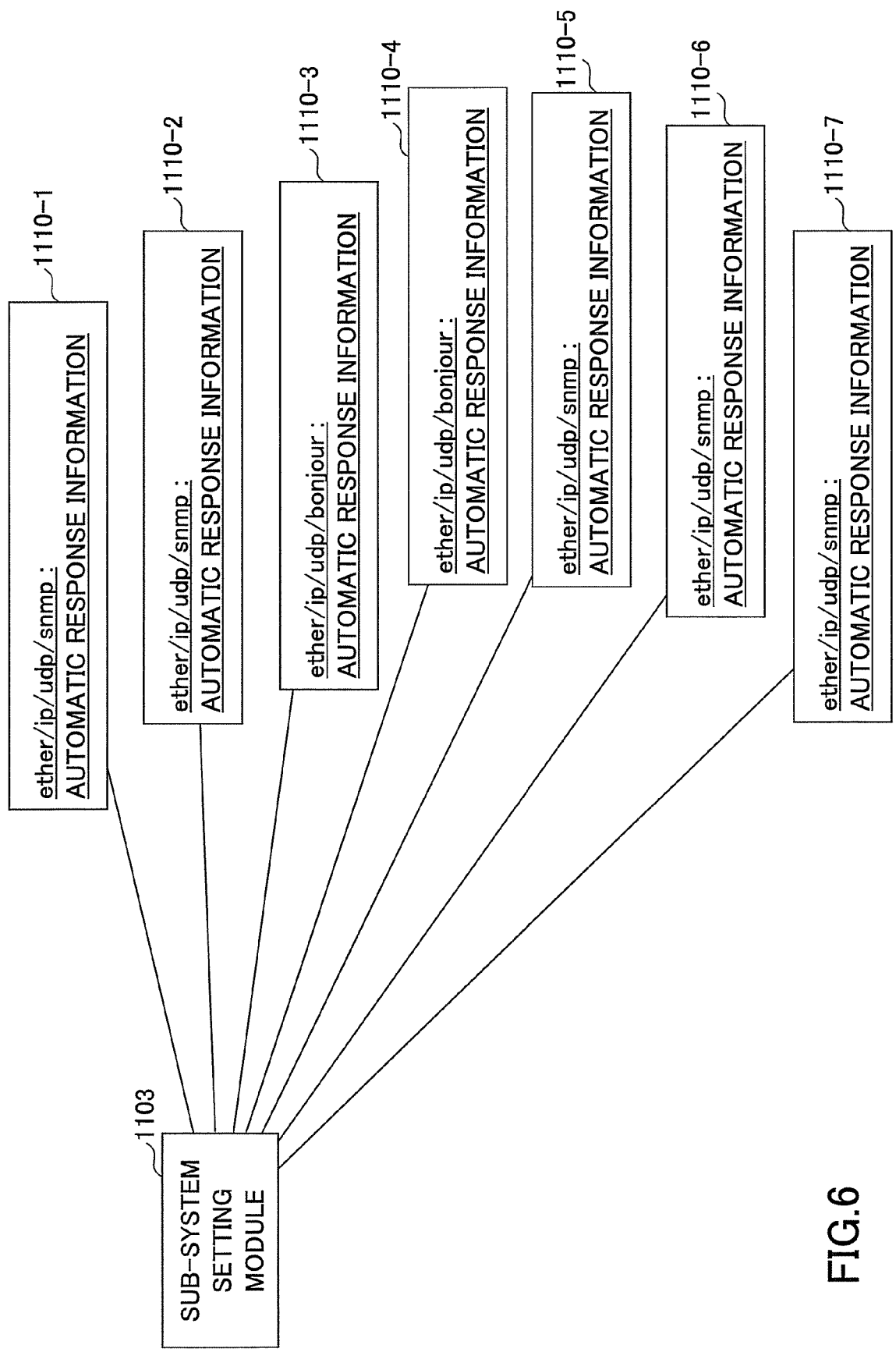
FIG. 6 is a drawing showing a relationship between a sub-system setting module and collected automatic response information.

FIG. 6 is a drawing showing a relationship between a sub-system setting module and automatic response information. FIG. 6 illustrates an example in which the automatic response information 1110 includes 7 automatic response information pieces 1110-1 through 1110-7. It should be noted that plural automatic response information pieces 1110 may be collected from a single communication control module 1102. Collecting of automatic response information 1110 may be performed by the sub-system setting module 1103 by fetching the automatic response information 1110 from the communication control module 1102 or by the communication control module 1102 sending it to the sub-system setting module 1103.

The automatic response information 1110 collected (registered) in the sub-system setting module 1103 may be updated in response to a change in the settings of the image forming apparatus 10 or communication control module 1102. For example, the automatic response information 1110 of a given communication control module 1102 may be edited by a user using the operation panel 131 or the like. In such a case, the communication control module 1102 sends the edited automatic response information 1110 to the sub-system setting module 1103 (S102). The sub-system setting module 1103 updates (e.g., replaces) the automatic response information 1110 associated with this communication control module 1102 in the RAM 113 with the newly supplied automatic response information 1110.

The automatic response information 1110 collected (registered) in the sub-system setting module 1103 is removed when automatic response is no longer necessary. For example, a given communication control module 1102 may, automatically or in response to a user setting, detect that automatic response is no longer necessary. In such a case, the communication control module 1102 requests the sub-system setting module 1103 to remove the automatic response information 1110 (S103). The sub-system setting module 1103 removes the automatic response information 1110 associated with this communication control module 1102 from the RAM 113. Step S103 is also performed when a given communication control module 1102 is uninstalled.

Figure 7:
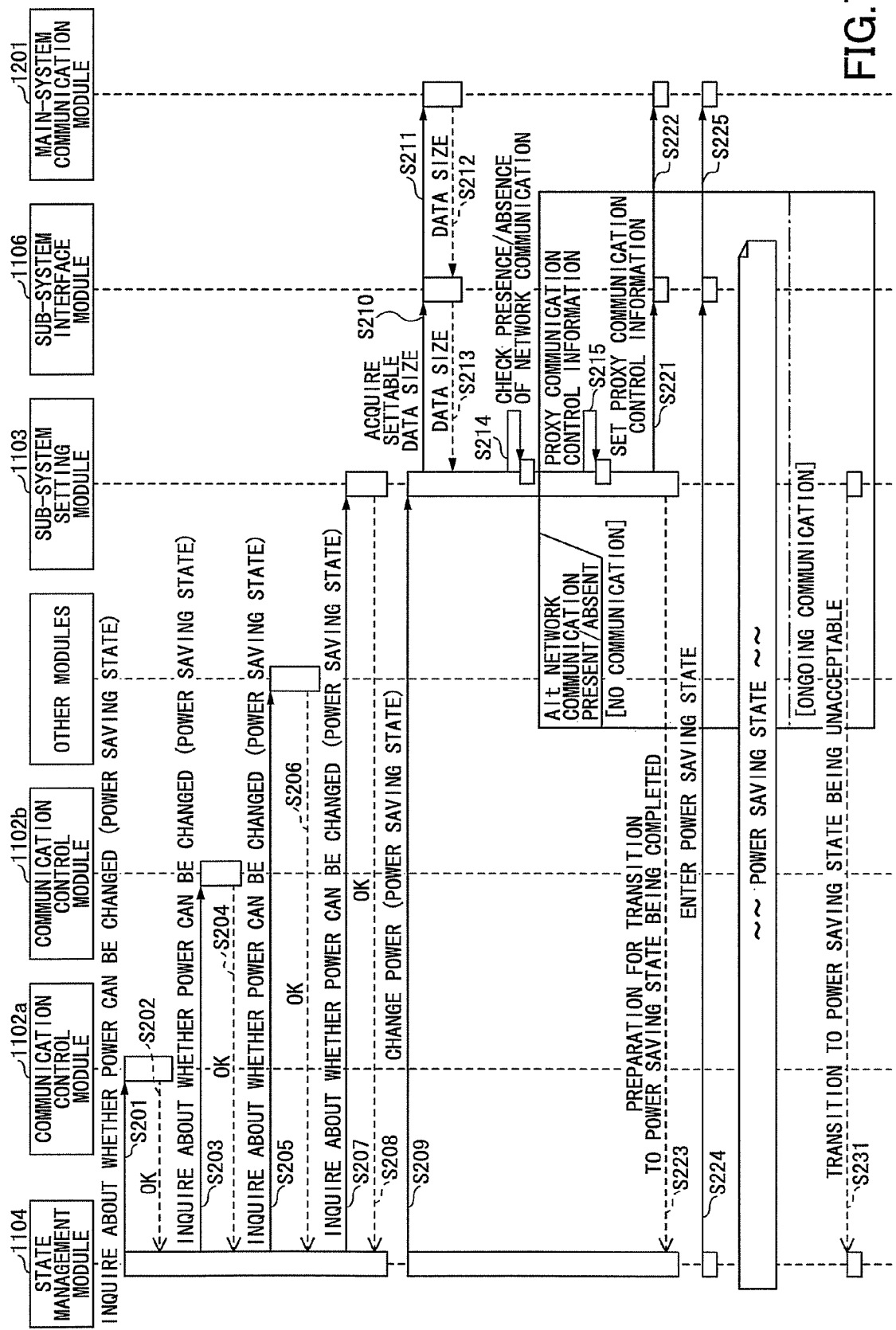
FIG. 7 is a sequence chart illustrating the operation procedure of performing transition to a power saving state in the image forming apparatus.

In the following, a description will be given of the procedure of performing a transition to the power saving state. FIG. 7 is a sequence chart illustrating the operation procedure of performing transition to the power saving state in the image forming apparatus.

The state management module 1104 may detect that no operational input is entered for a predetermined period of time, and, in response to such detection, decides to perform transition to the power saving state. Having made this decision, the state management module 1104 contacts each communication control module 1102 and other modules to inquire about the properness of transition to the power saving state (S201, S203, S205, S207). These other modules are various types of program modules not illustrated in FIG. 2. Upon receiving a response indicative of improperness of transition from any one of the contacted program modules, the state management module 1104 aborts the transition to the power saving state. A response indicative of improperness of transition may be supplied when a program module has ongoing communication or has a series of processes that have not been completed.

Upon receiving a response indicative of adequacy of transition (i.e., transition OK) from all the contacted program modules (S202, S204, S206, S208), the state management module 1104 notifies the sub-system setting module 1103 that transition to the power saving state is to be performed (S209). In response to the notification, the sub-system setting module 1103 contacts the sub system S via the sub-system interface module 1106 to inquire about the amount of information (i.e., data size) settable in the sub system S (S210, S211). In response to the inquiry, the main-system communication module 1201 of the sub system S calculates the amount of acceptable information based on the available memory volume of the RAM 123, followed by returning the calculated amount (S212, S213).

The sub-system setting module 1103 then checks whether any network communication is underway (S214). This check is the final check as to whether transition to the power saving state is performed.

When no network communication is underway, the sub-system setting module 1103 generates the proxy communication control information 1210 inclusive of the automatic response information 1110 that has already been collected from each communication control module 1102 through the process of FIG. 3 and stored in the RAM 113 (S215).

FIG. 8 is a drawing showing an example of the structure of proxy communication control information. In FIG. 8, the proxy communication control information 1210 includes an MAC address, an IP address, a list of port numbers, and a list of automatic response information pieces.

The MAC address and IP address are the present values of MAC address and IP address of the image forming apparatus 10. The list of port numbers specifies ports (e.g., TCP or UDP ports) that are currently available for reception purposes in the main system M. The list of automatic response information pieces specifies the automatic response information pieces 1110 (see FIG. 4) that are collected from the respective communication control modules 1102 through the process of FIG. 3.

The sub-system setting module 1103 transmits (i.e., sets) the generated proxy communication control information 1210 to the sub system S through the sub-system interface module 1106 (S221, S222). The main-system communication module 1201 of the sub system S stores the received proxy communication control information 1210 in the RAM 123 of the sub system S.

After this, the sub-system setting module 1103 notifies the state management module 1104 that the preparation for transition to the power saving state has been completed (S223). In response to the notification, the state management module 1104 notifies the sub system S through the sub-system interface module 1106 that transition to the power saving state should be performed (S224, S225). Upon receiving the notice at the main-system communication module 1201, the sub system S enters an operation state corresponding to the power saving state. Specifically, the functions of the automatic response condition check module 1202 and the automatic response module 1203 are enabled. The enabling of functions may change the values of flag variables indicative of the enabled or disabled status of these functions, or may activate the automatic response condition check module 1202 and the automatic response module 1203 as processes or threads.

The image forming apparatus 10 thereafter enters the power saving state, so that the power to the main system M is suspended or reduced.

If it is determined in step S214 that network communication is underway, the sub-system setting module 1103 notifies the state management module 1104 that transition to the power saving state is not to be performed (S231). In response to the notice, the state management module 1104 aborts the transition to the power saving state.

Figure 9:
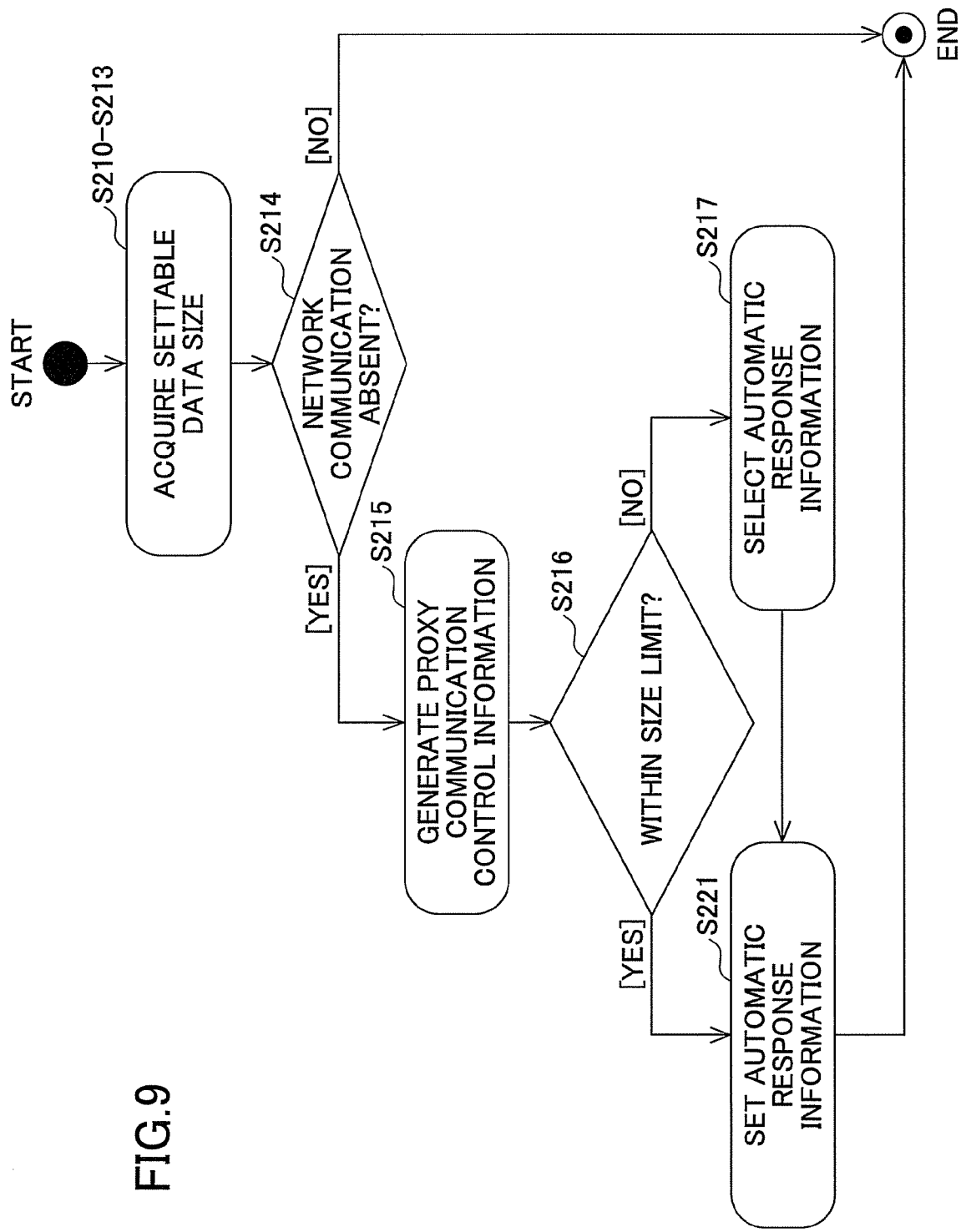
FIG. 9 is a drawing illustrating the operation procedure of preparing for transition to the power saving state performed by the sub-system setting module.

In the following, a description will be given of the detail of the process (S210 through S221) of preparing for transition to the power saving state performed by the sub-system setting module 1103. FIG. 9 is a drawing illustrating the operation procedure of preparing for transition to the power saving state performed by the sub-system setting module. In FIG. 9, the same steps as those of FIG. 7 are referred to by the same numerals, and a description thereof will be omitted.

In FIG. 9, steps S216 and S217 are additionally provided. After generating the proxy communication control information 1210 (S215), the sub-system setting module 1103 compares (S216) the data size of the generated proxy communication control information 1210 with the size of data settable in the sub system S that has been acquired in steps S210 through S213. If the data size of the proxy communication control information 1210 is larger, the sub-system setting module 1103 selects the automatic response information 1110 to be included in the list of automatic response information pieces such that the proxy communication control information 1210 becomes smaller than the data size settable in the sub system S (S217). Namely, rather than including all the collected automatic response information pieces 1110 in the proxy communication control information 1210, only a part of the automatic response information pieces 1110 that has relatively higher priority is selected and included in the proxy communication control information 1210. Seven automatic response information pieces 1110 may be collected as illustrated in FIG. 6. In such a case, those pieces which have relatively high priority among the seven pieces are selected within the limit settable in the sub system S. As a result, the proxy communication control information 1210 that includes only the selected part of the automatic response information 1110 is set in the sub system S in step S221.

The priority used for selecting the automatic response information 1110 may be the number of received packets that are counted by the packet monitor module 1105 in the normal power state. Specifically, after step S101, S102, or S103, the sub-system setting module 1103 instructs the packet monitor module 1105 to count received packets based on the list of automatic response information pieces 1110 that are currently registered. The packet monitor module 1105 compares a received packet with each automatic response information piece 1110. If the received packet matches any one of the automatic response information pieces 1110, the packet monitor module 1105 increments the count (i.e., the number of received packets) for the corresponding automatic response information 1110. This count is stored in the RAM 113. The monitor period during which the packet monitor module 1105 counts received packets may be set to the longest of all the monitor periods set in the respective automatic response information pieces 1110.

At the time of power-on of the image forming apparatus 10, step S101 may be performed multiple times. At the time of power-on of the image forming apparatus 10, however, the monitoring of received packets is not performed each time step S101 is performed, but is performed once (for one monitor period) after all the automatic response information pieces 1110 are collected from all the installed communication control modules 1102. The image forming apparatus 10 may have a FAX function. In such a case, the image forming apparatus 10 may be kept in operation all the time. The automatic response information 1110 having relatively high priority may be different between the day time and the night time. This is because the number of terminals connected to a network decreases at night, and requests for maintenance purposes may also be received. Such a difference also exists between weekdays and weekends. In such a case, received packets are monitored once (for one monitor period) at a prescribed time (or day).

The sub-system setting module 1103 selects automatic response information pieces 1110 by use of the counts obtained by the packet monitor module 1105. Namely, automatic response information pieces 1110 are successively included in the proxy communication control information 1210 in the descending order of counts until the limit settable in the sub system S is reached.

The automatic response information 1110 having higher priority may be selected by a user. For example, the sub-system setting module 1103 may present the list of automatic response information pieces 1110 on the operation panel 131, and may allow a user to determine a priority order or priority levels (which will hereinafter be referred to simply as "priority"). The sub-system setting module 1103 then selects automatic response information pieces 1110 according to the specified priority.

The automatic response information 1110 is represented in terms of packets. It may be difficult for an end user to understand information of such a low level. In consideration of this, a more user-friendly interface may be provided to allow a user to easily understand and determine the priority of automatic response information pieces 1110.

Figure 10:
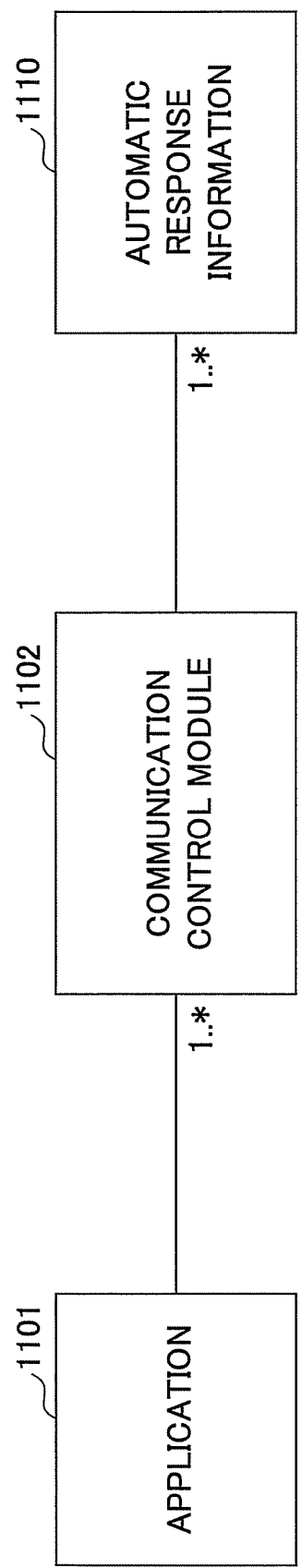
FIG. 10 is a drawing showing the relationship between an application, a communication control module, and automatic response information.

As illustrated in FIG. 10, the automatic response information 1110 has a relationship with the application 1101 through the communication control module 1102. FIG. 10 is a drawing showing the relationship between an application, a communication control module, and automatic response information. The application 1101 illustrated in FIG. 10 serves to perform communication. The communication control module 1102 illustrated in FIG. 10 has the automatic response information 1110 defined therefore (i.e., attached thereto). The application 1101 uses more than one communication control module 1102. Further, the communication control module 1102 has more than one automatic response information piece 1110.

Figure 11:
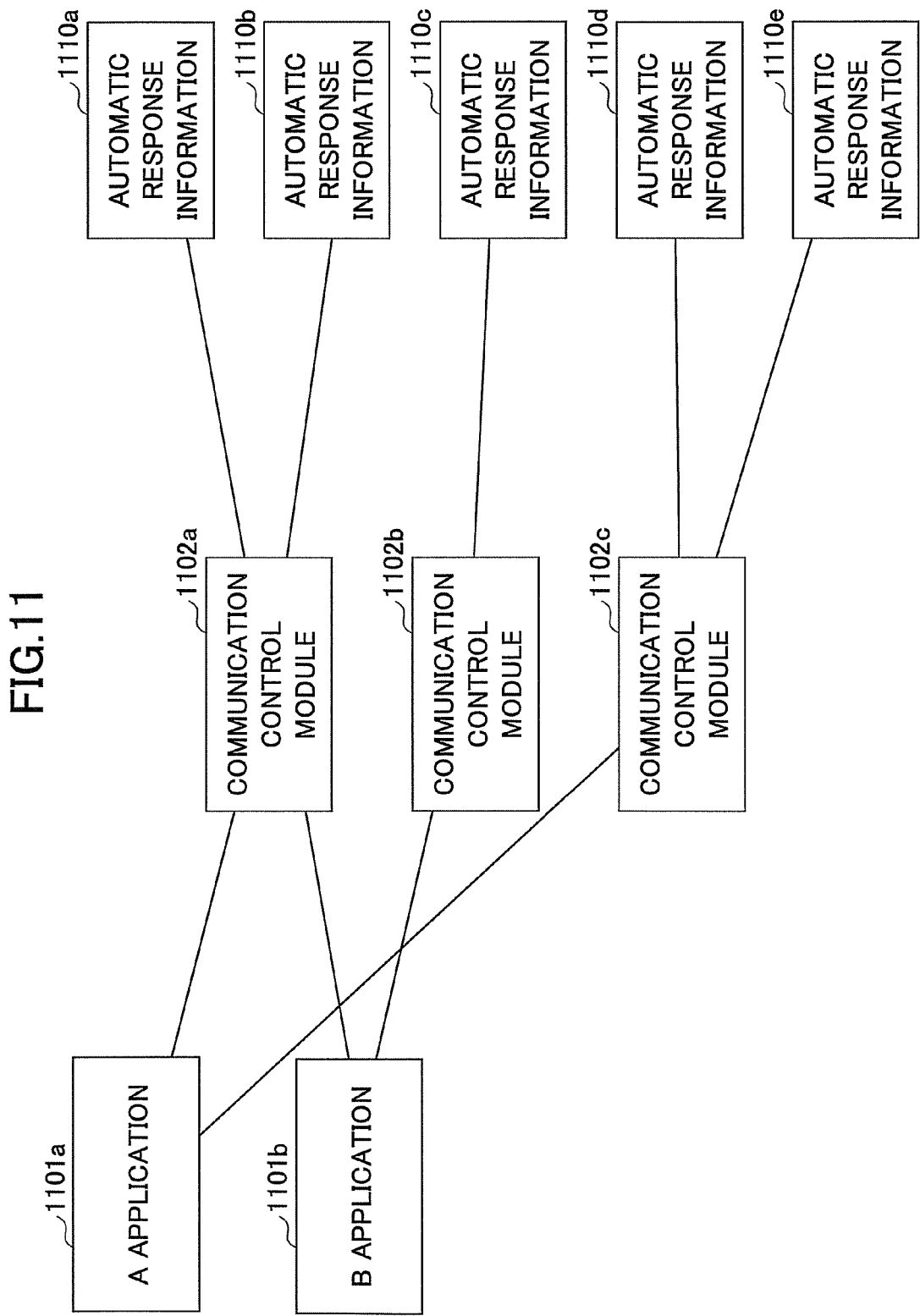
FIG. 11 is a drawing showing the relationship between application instances, communication control module instances, and automatic response information instances.

What is illustrated in FIG. 10 may be expanded to an instance level (i.e., substance level) as illustrated in FIG. 11, for example. FIG. 11 is a drawing showing the relationship between application instances, communication control module instances, and automatic response information instances.

In FIG. 11, an A application 1101a and a B application 1101b are illustrated as instances of the application 1101. The A application 1101a uses a communication control module 1102a and a communication control module 1102c. The B application 1101b uses the communication control module 1102a and a communication control module 1102b.

The communication control module 1102a has automatic response information 1110a and automatic response information 1110b. The communication control module 1102b has automatic response information 1110c. The communication control module 1102c has automatic response information 1110d and automatic response information 1110e.

Information indicative of such relationships (especially usage relationships between the applications 1101 and the communication control modules 1102) may be stored in the HDD 117 in advance. The HDD 117 serves as a usage relationship storage unit. The sub-system setting module 1103 may present the list of applications 1101 on the operation panel 131 based on such information, thereby allowing a user to determine automatic response priority for each application 1101. The sub-system setting module 1103 stores the priority set for a given application 1101 in the RAM 113 as the priority of the automatic response information pieces 1110 collected from the communication control modules 1102 used by the given application 1101.

In the example of FIG. 11, the priority set for the A application 1101a is used as the priority of the automatic response information pieces 1110a, 1110b, 1110d, and 1110e. By the same token, the priority set for the B application 1101b is used as the priority of the automatic response information pieces 1110a, 1110b, and 1110c.

In this manner, provision may be made such that priority is set on an application-specific basis. This provides a setting environment that is easy for a user to understand.

In the following, a description will be given of a process performed in the power saving state by the sub system S in which the proxy communication control information 1210 is set.

Figure 12:
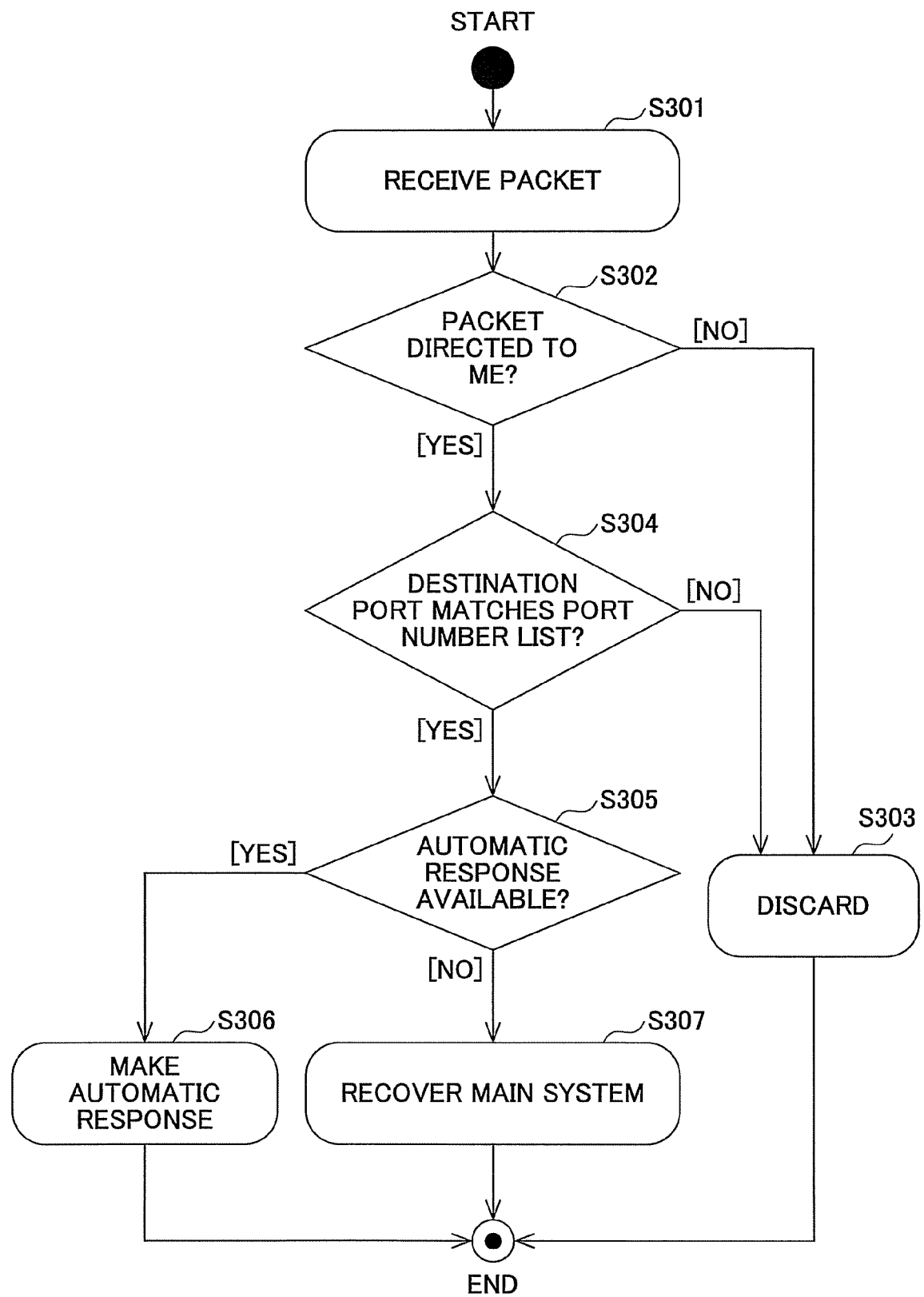
FIG. 12 is a drawing illustrating the procedure of filtering received packets performed by the sub system.

FIG. 12 is a drawing illustrating the procedure of filtering received packets performed by the sub system.

When the sub system S receives a packet (i.e., frame) in the power saving state (S301), the automatic response condition check module 1202 of the sub system S checks whether the received packet is directed to the image forming apparatus 10 (S302). Specifically, a check is made as to whether the destination MAC address and destination IP address of the received packet match the MAC address and IP address contained in the proxy communication control information 1210. When they do not match, the automatic response condition check module 1202 determines that the received packet is not directed to the image forming apparatus 10, followed by discarding the received packet (S303). If the received packet is a broadcast packet, the automatic response condition check module 1202 determines that the received packet is directed to the image forming apparatus 10. If the received packet is a multicast packet, the automatic response condition check module 1202 determines that the received packet is directed to the image forming apparatus 10 upon finding that the image forming apparatus 10 belongs to the relevant multicast group.

Upon determining that the received packet is directed to the image forming apparatus 10, the automatic response condition check module 1202 checks whether the destination port number of the received packet matches any one of the port numbers listed in the port number list of the proxy communication control information 1210 (S304). When the destination port number of the received packet does not match any one of the port numbers listed in the port number list, the automatic response condition check module 1202 discards the received packet (S303). When the destination port number of the received packet matches any one of the port numbers listed in the port number list, the automatic response condition check module 1202 checks, by use of the list of automatic response information pieces contained in the proxy communication control information 1210, whether automatic response is available with respect to the received packet (S305). If it is ascertained that automatic response is available, the automatic response module 1203 makes the automatic response (S306). If it is ascertained that automatic response is not available (or the main system M should be recovered), the automatic response condition check module 1202 transmits a recovery request to the main system M through the main-system communication module 1201 (S307). In response to the recovery request, the main system M recovers. Namely, the image forming apparatus 10 is placed in the normal power state.

Figure 13:
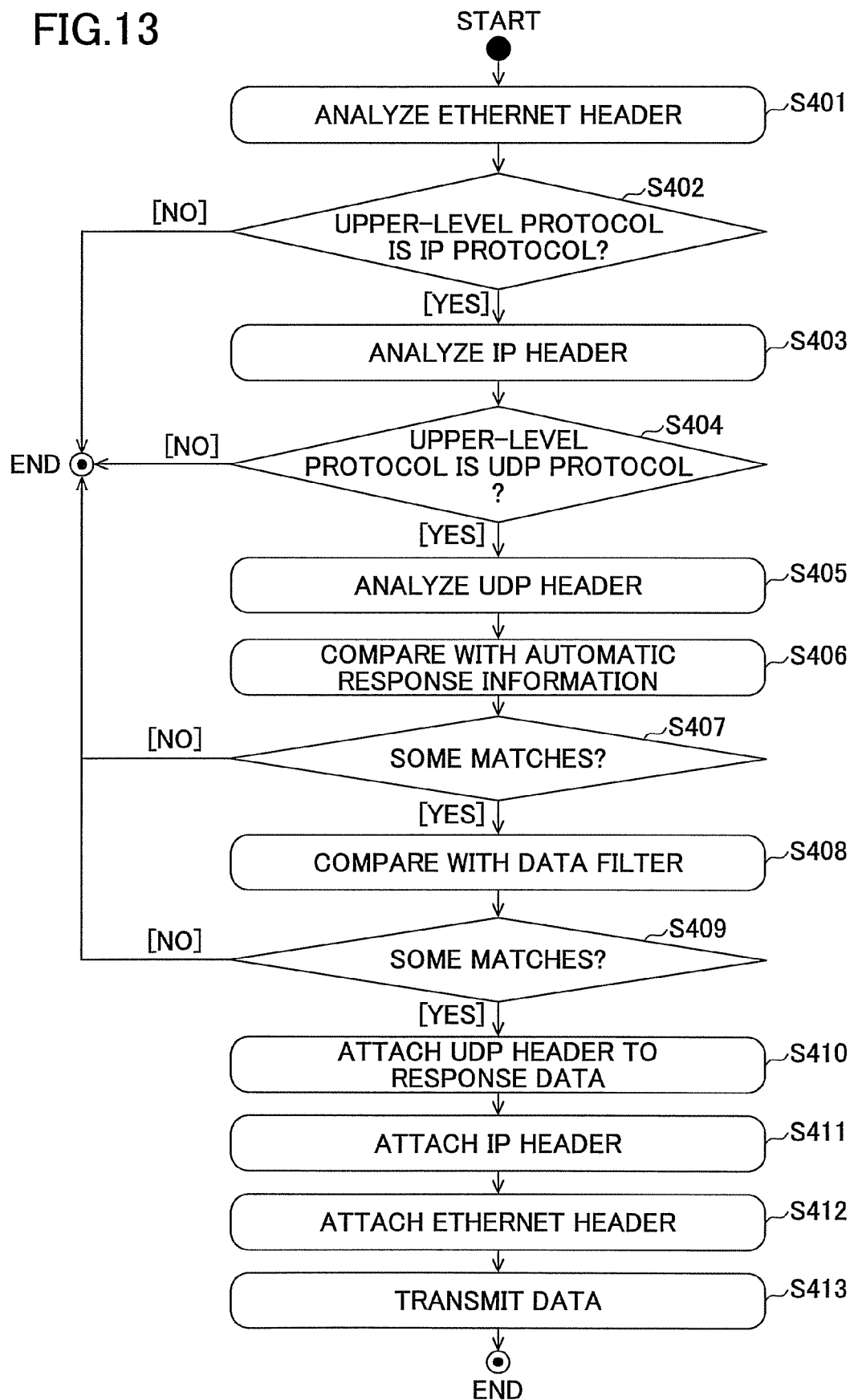
FIG. 13 is a drawing illustrating the procedure of checking the availability of an automatic response and making the automatic response as performed by the sub system.

In the following, the detail of steps S305 and S306 will be described. FIG. 13 is a drawing illustrating the procedure of checking the availability of automatic response and making the automatic response as performed by the sub system.

The automatic response condition check module 1202 analyzes (S401) the Ethernet (registered trademark) header of the received packet (i.e., received frame to be exact) to check (S402) whether the upper-level protocol is IP. When the upper-level protocol is IP (YES in S402), the automatic response condition check module 1202 analyzes the IP header (S403) to check whether the upper-level protocol is UDP (S404). When the upper-level protocol is UDP (YES in S404), the automatic response condition check module 1202 analyzes the UDP header (S405), and compares the source port number and destination port number of the received packet with the source port number and destination port number of each automatic response information piece 1110 belonging to the list of automatic response information pieces included in the proxy communication control information 1210 (S406). As a result of comparison, the automatic response information 1110 that matches the received packet is selected. It should be noted that only one of a source port number and a destination port number is subjected to comparison if only one of these is specified in a given automatic response information piece 1110. Further, if neither a source port number nor a destination port number is specified in a given automatic response information piece 1110, such automatic response information piece 1110 is selected without being subjected to comparison.

When the automatic response information 1110 that matches the received packet is selected (YES in S407), the automatic response condition check module 1202 compares the data portion of the received packet (which is a UDP packet) with the data filters of the selected automatic response information 1110 (S408). Namely, the character string situated at the offset position in the data portion is compared with the keyword of each data filter. When the character string matches the keyword, it is determined that the automatic response information 1110 including the data filter matches the received packet. Matching is checked by use of either an AND condition or an OR condition if the automatic response information 1110 includes a plurality of data filters.

When there is automatic response information 1110 whose data filter matches the received packet (YES in S409), the automatic response condition check module 1202 determines that automatic response is available. In response, the automatic response module 1203 identifies response data based on the response data information of the above-noted automatic response information 1110, and adds a UDP header to the response data to generate a UDP packet (S410). The source port number of the UDP header is set equal to the destination port number of the received packet. The destination port number of the UDP header is set equal to the source port number of the received packet.

The automatic response module 1203 then adds an IP header to the UDP packet to generate an IP packet (S411). The source IP address of the IP header is set equal to the IP address contained in the proxy communication control information 1210. The destination IP address of the IP header is set equal to the source IP address of the received packet. The automatic response module 1203 subsequently adds an Ethernet (registered trademark) header to the IP packet to generate an Ethernet frame (S412). The source MAC address of the Ethernet header is set equal to the MAC address contained in the proxy communication control information 1210. The destination MAC address of the Ethernet header is set equal to the source MAC address of the received packet (i.e., received frame). The automatic response module 1203 then transmits the generated data (i.e., Ethernet frame) to the network (S413). Namely, the automatic response is made.

If the check result is negative in step S402, S404, S407, or S409, the automatic response condition check module 1202 determines that the automatic response is not available. Consequently, step S307 of FIG. 12 is performed to recover the main system M.

The above-described procedure also applies in the case of an application 1101 being added, rather than a communication control module 1102 being added. There may be a case in which the received packet contains data to be used by the main system M upon recovery. In such a case, the automatic response module 1203 first stores this data in the RAM 123, and then transfers the data to the main system M after the main system M recovers.

An application (search application) 1101 for searching for a program running on a PC (personal computer) on a network may be running on the main system M. The search application transmits a search request to the same segment as the segment of the image forming apparatus 10 by use of multicast, and transmits a search request to different segments than the segment of the image forming apparatus 10 by use of unicast. The search application detects the presence of the program based on a response from the program responding to the search request.

A search request using unicast specifies an IP address, which may be registered by a PC. PCs belonging to different segments than the segment of the image forming apparatus 10 transmit a request to register an IP address to the image forming apparatus 10 at irregular intervals. Depending on the number of PCs, the image forming apparatus 10 may frequently receive such a request.

Automatic response information 1110 corresponding to the above-noted registration request may be defined for the search application as the automatic response information 1110 of the communication control module 1102 assigned to a communication protocol that is used for the registration request. With this arrangement, the registration request is subjected to automatic response by the sub system S. Even when a registration request is received in the power saving state, the power saving state is not disabled.

In the above-noted circumstances, the automatic response module 1203 first stores the IP address of the received registration request in the RAM 123, and then transfers the IP address to the main system M after the main system M recovers. With this arrangement, the search application of the main system M can recognize the IP address as a search target. In a unicast search performed thereafter, this IP address is used as a search target. If the number of IP addresses that can be registered in the search application is limited, an IP address may be disregarded if registration requests are received in excess of the limit. The main system M may be recovered when registration requests are received in excess of the limit, so that needless IP addresses may be removed, followed by registering new IP addresses. The needless IP addresses may be removed upon recovery of the main system M, so that as many IP addresses may be stored in the RAM 123 as the available volume of the RAM 123 allows, without any regard to the above-noted limit. Received packets may be monitored once (i.e., for one monitor period) upon or after using the application.

According to the present embodiment, the sub system S makes automatic response based on the automatic response information 1110 that is dynamically acquired from each communication control module 1102. When an application 1101 or communication control module 1102 is newly installed, appropriate automatic response information 1110 may be defined for the communication control module 1102. This makes it possible to avoid the shortening of duration of the power saving state. As a result, power consumption is properly reduced. Further, since the automatic response information 1110 is contained in the added application 1101, a proper recovery process may be performed in accordance with the protocol used by the added application 1101.

In order to avoid a cost increase of the image forming apparatus 10, restrictions on resources (e.g., restriction on the volume of the RAM 123) tend to become stricter for the sub system S than for the main system M. There may thus be a case in which all the automatic response information pieces 1110 cannot be stored in the RAM 123. The present embodiment takes into account such circumstances, so that automatic response information pieces 1110 are selected within the limit storable in the RAM 123. The automatic response information pieces 1110 are selected in response to the conditions of packets flowing through the network, so that the range of automatic response may be properly changed in conformity to the network conditions. As a result, the power saving state is prolonged.

Provision may be made such that the automatic response information 1110 is shared by plural image forming apparatuses 10. For example, the sub-system setting module 1103 of a given image forming apparatus 10 collects automatic response information 1110, and stores the collected automatic response information 1110 in a file server on a network. Other image forming apparatuses 10 may acquire and utilize the automatic response information 1110 from the file server. With such an arrangement, the power saving state may properly be maintained in a newly installed image forming apparatus 10 by utilizing the automatic response information 1110 of another image forming apparatus 10. A response data identifier specified in the response data information may be specific to each image forming apparatus 10. In such a case, the automatic response information 1110 having a response data identifier may be excluded from those which are shared. The communication protocol for transferring the automatic response information 1110 may be HTTP or FTP, for example.

The present embodiment has been described with respect to the case in which the image forming apparatus 10 is used as an example of a communication apparatus. This is not a limiting example, and the apparatus of the present invention is not limited to the image forming apparatus 10. The present invention is applicable to any apparatus as long as the apparatus has a power saving state that may be disabled (i.e., exited) upon receiving data.

Further, the present invention is not limited to these embodiments, but various variations and modifications may be made without departing from the scope of the present invention.

The present application is based on Japanese priority application No. 2009-188675 filed on Aug. 17, 2009, with the Japanese Patent Office, the entire contents of which are hereby incorporated by reference.

What is claimed is:

1. A communication apparatus having a plurality of communication control programs for controlling communication, comprising:
an automatic response unit configured to make a response to received data in a power saving state on behalf of the communication control programs; and
a setting unit configured to collect information pieces of automatic response information from respective ones of the communication control programs and to set the information pieces of the automatic response information in the automatic response unit separately for the respective ones of the communication control programs, each information piece of the automatic response information including corresponding conditions regarding received data to which the automatic response unit makes a response, and also including corresponding response data to be included in the response,
wherein the automatic response unit sends the response data corresponding to a given information piece included in the automatic response information upon detecting that the conditions corresponding to the given information piece included in the automatic response information match data received in the power saving state, and causes the communication apparatus to exit the power saving state upon detecting, that the conditions corresponding to the given information piece do not match said data received in the power saving state.

2. The communication apparatus as claimed in claim 1, further comprising a monitor unit configured to count a number of receptions of data that match the conditions included in the automatic response information, said number being counted separately for each information piece of the automatic response information,
wherein the setting unit selects information pieces of the automatic response information to be set in the automatic response unit based on the number of receptions when an amount of collected automatic response information exceeds an amount settable in the automatic response unit.

3. The communication apparatus as claimed in claim 1, further comprising a setting receiving unit configured to allow priority of each information piece of the automatic response information to be specified by a user,
wherein the setting unit selects information pieces of the automatic response information to be set in the automatic response unit based on the specified priority when an amount of collected automatic response information exceeds an amount settable in the automatic response unit.

4. The communication apparatus as claimed in claim 3, wherein the setting receiving unit allows the priority to be specified separately for each application that utilizes at least one of the one or more communication control programs, and the setting unit uses information indicative of relationships between applications and the one or more communication control programs to select information pieces of the automatic response information to be set in the automatic response unit by applying the priority specified for a given application to information pieces of the automatic response information that are collected from at least one of the one or more communication control programs utilized by said given application.

5. A communication method in a communication apparatus having a plurality of communication control programs for controlling communication, comprising:
an automatic response step of, by use of an automatic response unit, making a response to received data in a power saving state on behalf of the communication control programs;
a setting step of, by use of a setting unit, collecting information pieces of automatic response information from respective ones of the communication control programs and setting the information pieces of the automatic response information in the automatic response unit separately for the respective ones of the communication control programs, each information piece of the automatic response information including corresponding conditions regarding received data to which the automatic response unit makes a response, and also including corresponding response data to be included in the response; and
a recovery control step of causing the communication apparatus to exit the power saving state based on comparison of received data in the power saving state with the automatic response information,
wherein the automatic response step sends the response data corresponding to a given information piece included in the automatic response information upon detecting that the conditions corresponding to the given information piece included in the automatic response information match data received in the power saving state, and causes the communication apparatus to exit the power saving state upon detecting that the conditions corresponding to the given information piece do not match said data received in the power saving state.

6. A computer-readable recording medium having a program recorded therein for causing a communication apparatus having a plurality of communication control programs for controlling communication to function as:

an automatic response unit configured to make a response to received data in a power saving state on behalf of the communication control programs; and a setting unit configured to collect information pieces of automatic response information from respective ones of the communication control programs and to set the information pieces of the automatic response information in the automatic response unit separately for the respective ones of the communication control programs, each information piece of the automatic response information including corresponding conditions regarding received data to which the automatic response unit makes a response, and also including corresponding response data to be included in the response, wherein the automatic response unit sends the response data corresponding to a given information piece included in the automatic response information upon detecting that the conditions corresponding to the given information piece included in the automatic response information match data received in the power saving state, and causes the communication apparatus to exit the power saving state upon detecting that the conditions corresponding to the given information piece do not match said data received in the power saving state.

* * * * *